United States Patent
Crofford

(10) Patent No.: US 12,034,882 B2
(45) Date of Patent: Jul. 9, 2024

(54) DYNAMIC E911 SYSTEM RECORDS UPDATING

(71) Applicant: DISH Wireless L.L.C., Englewood, CO (US)

(72) Inventor: Jon William Freeman Crofford, Denver, CO (US)

(73) Assignee: DISH WIRELESS L.L.C., Englewood, CO (US)

(*) Notice: Subject to any disclaimer, the term of this patent is extended or adjusted under 35 U.S.C. 154(b) by 201 days.

(21) Appl. No.: 17/866,356

(22) Filed: Jul. 15, 2022

(65) Prior Publication Data

US 2023/0336660 A1  Oct. 19, 2023

Related U.S. Application Data

(60) Provisional application No. 63/331,477, filed on Apr. 15, 2022.

(51) Int. Cl.
*H04M 11/04* (2006.01)
*G06F 16/23* (2019.01)
*H04M 3/51* (2006.01)

(52) U.S. Cl.
CPC ....... *H04M 3/5116* (2013.01); *G06F 16/2358* (2019.01); *H04M 2242/04* (2013.01)

(58) Field of Classification Search
CPC .......................... H04M 3/5116; G06F 16/2358
See application file for complete search history.

(56) References Cited

U.S. PATENT DOCUMENTS

| | | | | |
|---|---|---|---|---|
| 5,323,444 A * | 6/1994 | Ertz | ...... | H04Q 3/0029 379/49 |
| 5,379,337 A * | 1/1995 | Castillo | ...... | H04M 11/04 379/49 |
| 2006/0026198 A1* | 2/2006 | Emery | ...... | G06F 16/273 |
| 2008/0200143 A1* | 8/2008 | Qiu | ...... | H04M 11/04 455/404.2 |
| 2008/0248813 A1* | 10/2008 | Chatterjee | ...... | G01S 5/02524 455/456.2 |
| 2009/0307333 A1* | 12/2009 | Welingkar | ...... | H04L 67/1095 455/414.3 |
| 2010/0027469 A1* | 2/2010 | Gurajala | ...... | H04M 15/8038 370/328 |
| 2013/0285855 A1* | 10/2013 | Dupray | ...... | H04W 4/029 342/451 |

(Continued)

*Primary Examiner* — Simon King
(74) *Attorney, Agent, or Firm* — Seed IP Law Group LLP

(57) ABSTRACT

Systems and method are directed towards dynamically updating a remote management system of changes in e911 records. An e911 computing system may determine if an e911 record has been deleted from a local database. In response to determining that the e911 record has been deleted, the e911 computing system notifies a management system of the e911 record being deleted. The e911 computing system may also determine if the e911 record is new. In response to determining that the e911 record is new, the e911 computing system provides the e911 record to the management system. The e911 computing system may also determine if the e911 record has changed. In response to determining that the e911 record has changed: the e911 computing system generates a table of changes to the e911 record and provides the table of changes to the management system.

18 Claims, 4 Drawing Sheets

(56) References Cited

U.S. PATENT DOCUMENTS

2016/0007175 A1* 1/2016 Kadi ................. H04M 1/72457
　　　　　　　　　　　　　　　　　　　　　455/566
2017/0041963 A1* 2/2017 Edge .................... H04W 12/06
2018/0052958 A1* 2/2018 Crawford ............... G16H 40/63

* cited by examiner though the terms may also encompass the case where it is based only on those features, functions, aspects, or limitations. Additionally, the singular forms "a," "an," and "the" include plural references. The meaning of "in" includes "in" and "on." References to "the previous figure" or "the above figure" refer to the most recently discussed figure prior to the current discussion; references to "the next figure" or "the below figure" refer to the next figure following the current discussion.

DYNAMIC E911 SYSTEM RECORDS UPDATING

TECHNICAL FIELD

The present disclosure relates generally to e911 systems and, more particularly, to dynamically updating records in an e911 system.

BACKGROUND

Description of the Related Art

Mobile phones are being used more and more by more and more people. As the use of mobile phones has increased, so too has the need to make 911 calls from mobile phones. These calls are dependent on reliable, fast, and continuous communication with the wireless network. From time to time, wireless communication governing bodies may request data associated with wireless 911 calls, such as for an audit or when performing an inquiry of dropped 911 calls. Unfortunately, this data can change or be difficult to manage. It is with respect to these and other considerations that the embodiments described herein have been made.

BRIEF SUMMARY

Briefly described, embodiments are directed toward systems and methods of dynamically updating a remote management system of changes in e911 records. An e911 computing system receives an e911 record identifier of an e911 record, such as in response to a new, changed, or deleted e911 record. The e911 computing system may determine if the e911 record has been deleted from a database that is local to the e911 computing system. In response to determining that the e911 record has been deleted from the local database, the e911 computing system notifies the management system of the e911 record being deleted. The management system is remote from the e911 computing system. The e911 computing system may also determine if the e911 record is new. In response to determining that the e911 record is new, the e911 computing system provides the e911 record to the management system. The e911 computing system may also determine if the e911 record has changed. In response to determining that the e911 record has changed: the e911 computing system generates a table of changes to the e911 record and provides the table of changes to the management system.

In some embodiments, the e911 computing system may generate the table of changes by obtaining current e911 record data for the e911 record; obtaining previous e911 record data for the e911 record from the local database; and comparing the current e911 record data and the previous e911 record data to identify changes in the e911 record. In various embodiments, the e911 computing system may identify changes in the e911 record based on a comparison between the current e911 record data and the previous e911 record data and generate the table of changes from the identified changes.

In some embodiments, the e911 computing system may determine if the e911 record has been deleted from the local database by querying the local database for the e911 record identifier and identifying the e911 record as being deleted in response to the e911 record identifier not being found in the query.

In various embodiments, the e911 computing system may store the e911 record or an indication of the e911 record in the local database in response to determining that the e911 record is new.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
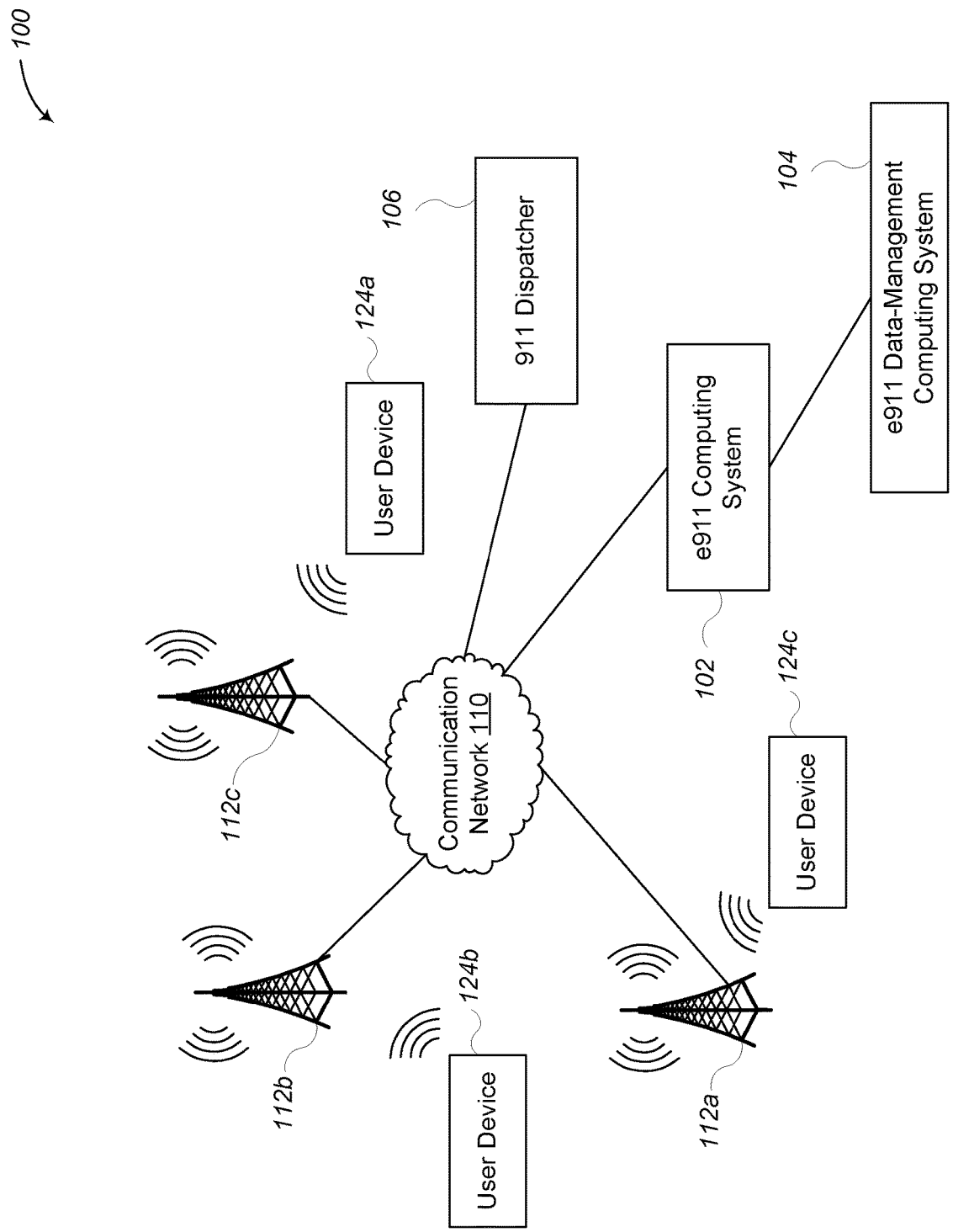
FIG. 1 illustrates a context diagram of an environment for providing an e911 system in accordance with embodiments described herein.

FIG. 1 illustrates a context diagram of an environment 100 for providing an e911 system in accordance with embodiments described herein. Environment 100 includes a plurality of cells 112a-112c, a plurality of user devices 124a-124c, an e911 computing system 102, an e911 data-management computing system 104, a 911 dispatcher 106, and a communication network 110.

The user devices 124a-124c are computing devices that receive and transmit cellular communication messages with the cells 112a-112c. Examples of user devices 124a-124c may include, but are not limited to, mobile devices, smartphones, tablets, cellular-enabled laptop computers, or other computing devices that can communication with a cellular network. The user devices 124a-124c are configured to transmit e911 calls to the 911 dispatcher 106. E911 calls are 911 phone calls or 911 messages made from user devices 124 to 911 dispatcher 106 via a cellular communication network.

The cells 112a-112c are cellular towers that together provide the hardware infrastructure of a cellular communications network, e.g., a 5G cellular communications network. The cells 112a-112c may include or be in communication with base stations, radio back haul equipment, antennas, or other devices, which are not illustrated for ease of discussion. In various embodiments, the cells 112a-112c may communicate with each other via communication network 110. Communication network 110 includes one or more wired or wireless networks, which may include a series of smaller or private connected networks that carry information between the cells 112a-112c.

The e911 computing system 102 is a computing device or cloud computing environment that manages or coordinates e911 calls between user devices 124 and the 911 dispatcher 106. In some embodiments, the e911 computing system 102 operates as an intermediate for e911 calls between the user devices 124 and the 911 dispatcher 106. In other embodiments, the e911 computing system 102 initially receives the e911 call, but transfers or hands off the e911 call to the 911 dispatcher, such that the e911 computing system 102 is not an intermediary during the remainder of the e911 call. In yet other embodiments, the e911 computing system 102 may transfer or hand off the e911 call to the e911 data-management computing system 104, such that the e911 data-management computing system 104 manages the e911 call between the user device 124 and the 911 dispatcher 106.

When an e911 call is made (or e911 message is sent) by a user device 124, the e911 computing system 102 generates a record of the e911 call. The record may include a variety of information about the e911 call, including information regarding the user device 124 making the call and the cell tower 112 that is communicating the call with the user device 124. For example, each e911 record may list a cell identifier of the cell 112 handling the e911 call with the user device 124, a GPS location of the cell 112 handling the e911 call with the user device 124, a street address of the cell 112 handling the e911 call with the user device 124, an altitude of the antenna of the cell 112 handling the e911 call with the user device 124, an azimuth of the antenna of the cell 112 handling the e911 call with the user device 124, a horizontal beamwidth of the antenna of the cell 112 handling the e911 call with the user device 124, an identifier of the specific radio on the cell 112 handling the e911 call with the user device 124, a time and date of the e911 call, an identifier of the user device making the e911 call, etc.

The e911 computing system 102 pushes new e911 records to the e911 data-management computing system 104 for archival, storage, and remote management. The e911 computing system 102 may also push changes in previously stored e911 records to the e911 data-management computing system 104. Such changes may occur if a characteristic of a cell 112 is changed during or after an e911 call is made. An example of an e911 record change may be a change in the antenna tilt or transmission power.

The e911 data-management computing system 104 is a computing device or cloud computing environment that stores and manages e911 records.

The 911 dispatcher 106 is configured as a 911 call center to take, manage, and respond to 911 calls.

Figure 2:
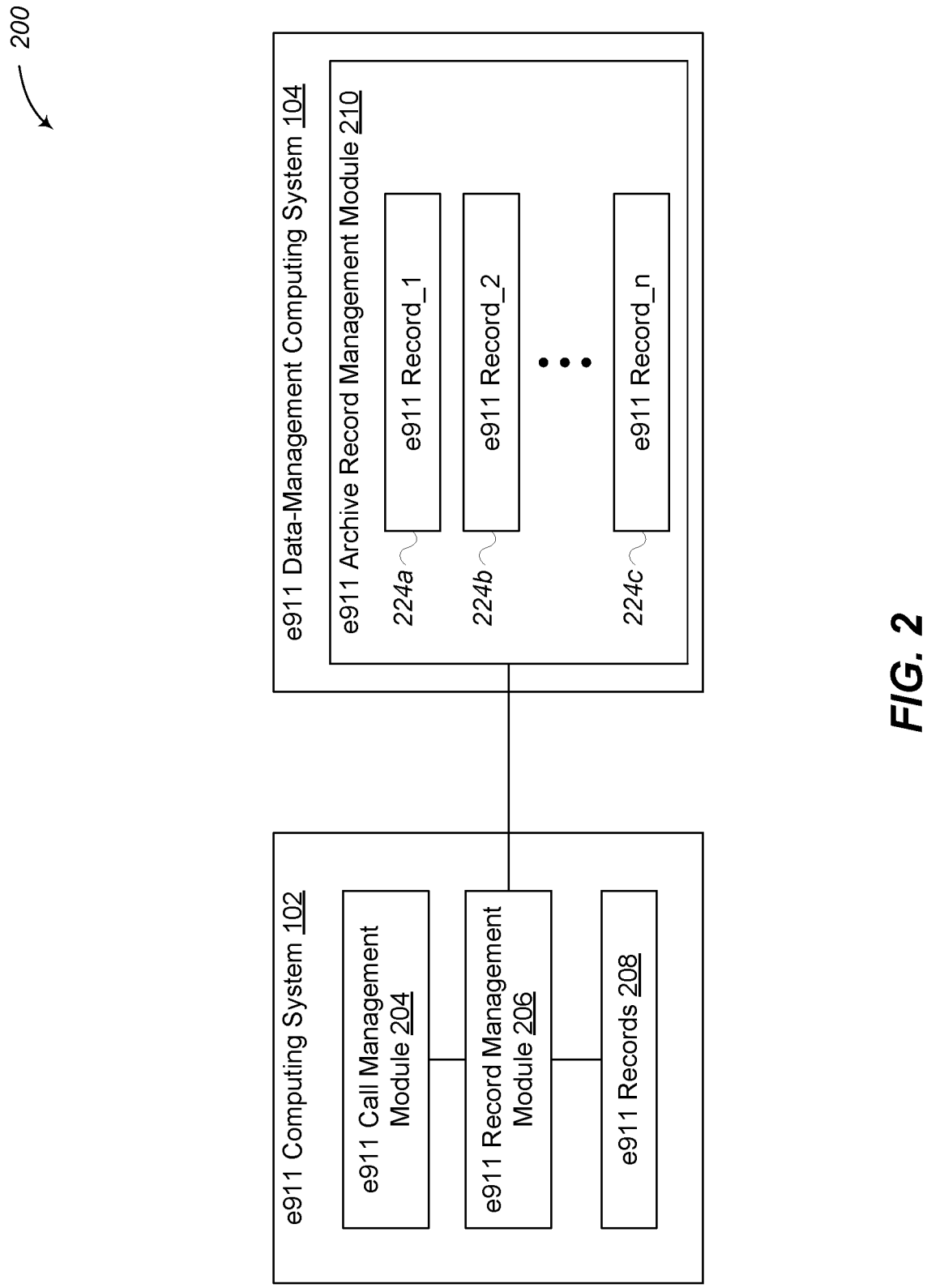
FIG. 2 is a context diagram of a non-limiting embodiment of systems that provide functionality to dynamically update e911 records in accordance with embodiments described herein.

FIG. 2 is a context diagram of a non-limiting embodiment of systems that provide functionality to dynamically update e911 records in accordance with embodiments described herein;

Example 200 includes an e911 computing system 102 and an e911 data-management computing system 104, similar to the e911 computing system 102 and e911 data-management computing system 104 shown in FIG. 1.

The e911 computing system 102 is configured to manage e911 calls and to provide e911 records to the e911 data-management computing system 104. The e911 computing system 102 includes an e911 call management module 204, an e911 record management module 206, and e911 records 208.

The e911 call management module 204 is configured to coordinate, handle, and otherwise manage e911 calls between user devices 124 and the 911 dispatcher 106 in FIG. 1. In various embodiments, the e911 call management module 204 generates new e911 records for new e911 calls. The e911 call management module 204 may also receive changes or modifications to existing e911 records. The e911 call management module 204 provides the e911 records to the e911 record management module 206. In some embodiments, the e911 call management module 204 may generate or obtain the information within the e911 records and provides such information to the e911 record management module 206, such that the e911 record management module 206 can generate the e911 records.

The e911 record management module 206 is configured to obtain or receive new e911 records from the e911 call management module 204. In some embodiments, the e911 record management module 206 may receive e911 call information from the e911 call management module 204 and generate e911 records from the received call information. The e911 record management module 206 stores new e911 records in the e911 records 208 as a local database and provides the new e911 records to the e911 data-management computing system 104.

The e911 record management module 206 is also configured to determine if previous e911 records have changed or been modified. If an e911 record has changed or if an e911 record is to be analyzed to determine if it has changed, the e911 record management module 206 compares a current e911 record to a previously stored e911 record. The e911 record management module 206 generates a table of all the parameters of the e911 record that have changed from the previously stored record to the current record. The e911 record management module 206 provides the table of changes to the e911 data-management computing system 104. The e911 record management module 206 may also store the change in the e911 records 208.

The e911 record management module 206 can also query the e911 records 208 to determine if an e911 record has been deleted. If a record has been deleted, then the e911 record management module 206 notifies the e911 data-management computing system 104 of the deleted record.

Although the e911 call management module 204 and the e911 record management module 206 are illustrated as separate modules, embodiments are not so limited. In some embodiments, the functionality of the e911 call management module 204 and the e911 record management module 206 may be performed by a single module or a plurality of modules.

The e911 data-management computing system 104 includes an e911 archive record management module 210. The e911 archive record management module 210 is configured to receive new, changed, or deleted e911 records from the e911 computing system 102. The e911 archive record management module 210 may store the e911 records as records 224a-224c.

Figure 3:
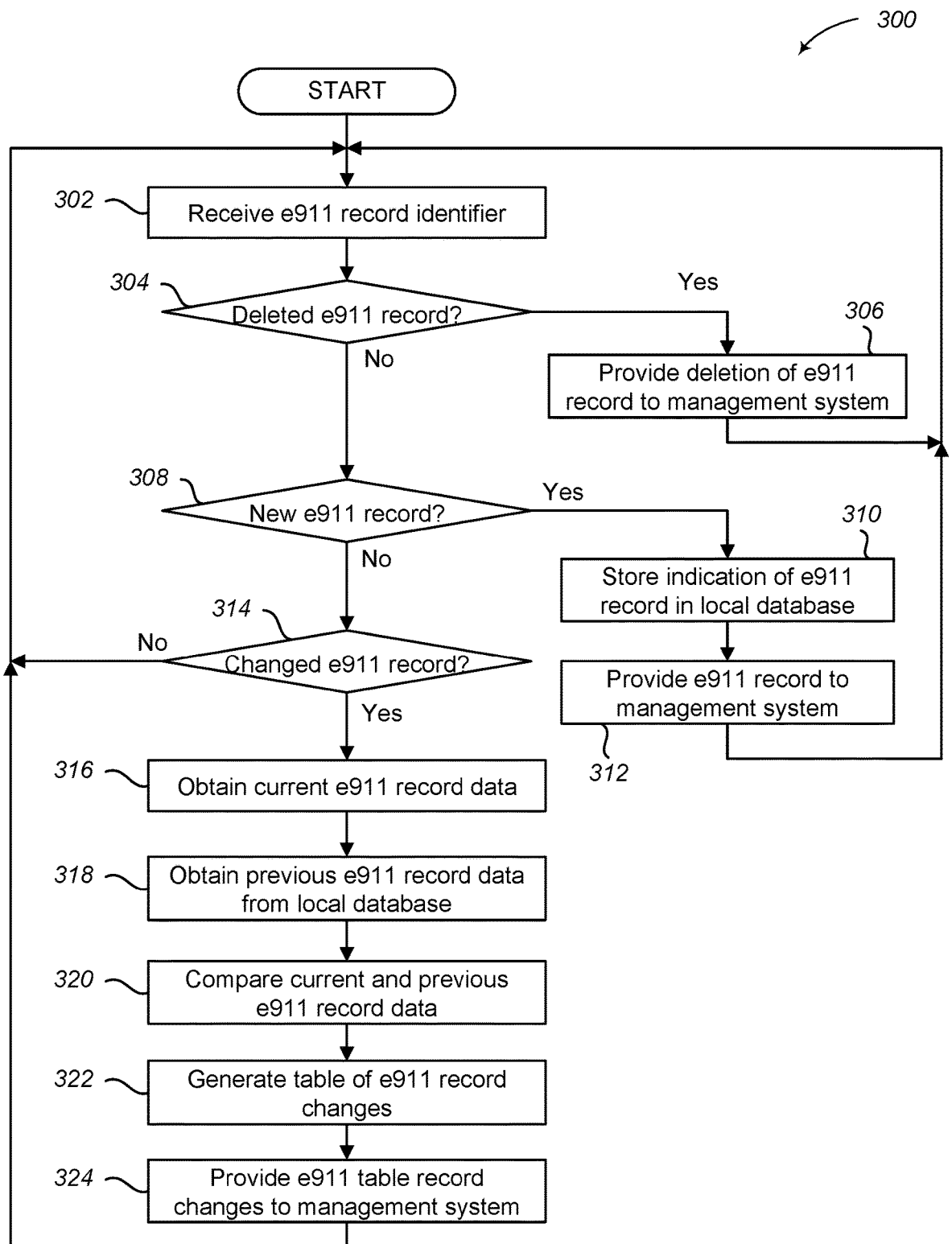
FIG. 3 illustrates a logical flow diagram showing one embodiment of a process for dynamically updating e911 records in accordance with embodiments described herein.

FIG. 3 illustrates a logical flow diagram showing one embodiment of a process 300 for dynamically updating e911 records in accordance with embodiments described herein. In at least one of various embodiments, process 300 may be implemented by or executed via circuitry or on one or more computing devices, such as e911 computing system 102 in FIG. 1.

Process 300 begins, after a start block, at block 302, where an e911 record identifier is received. In some embodiments, an entire e911 record is received. In other embodiments, only an identifier of the e911 record is received. This e911 record identifier may represent a new e911 record, a changed e911 record, or a deleted e911 record.

In various embodiments, the e911 record identifier is received during a periodic or administrator-requested audit of e911 records. In other embodiments, a new e911 record or a changed e911 record or a deletion of an e911 record may trigger process 300 and the receipt of the e911 record identifier.

Process 300 proceeds to decision block 304, where a determination is made whether the e911 record associated with the received e911 record identifier has been deleted. In some embodiments, a local database of e911 records may be analyzed to identify that the e911 record has been deleted since a previous check or audit of the local database for the e911 record. If the e911 record has been deleted, then process 300 flows to block 306; otherwise, process 300 flows to decision block 308.

At block 306, an indication of the deleted e911 record is provided to the e911 management system, such as e911 data-management computing system 104 in FIG. 1. In some embodiments, the e911 record identifier along with an indication that the corresponding e911 record has been deleted. In this way, the e911 data-management system can delete the corresponding e911 record. After block 306, process 300 loops to block 302 to receive another e911 record identifier.

If, at decision block 304, the e911 record is not deleted, then process 300 flows from decision block 304 to decision block 308. At decision block 308, a determination is made whether the received e911 record identifier is associated with a new e911 record. In some embodiments, the received e911 record identifier is compared to the local database of e911 records. If the received e911 record identifier is not stored in the local database, then the received e911 record identifier is associated with a new e911 record. In other embodiments, the received e911 record identifier may also include metadata or a tag indicating that it is a new e911 record. If the e911 record is new, then process 300 flows to block 310; otherwise, process 300 flows to decision block 314.

At block 310, an indication of the new e911 record is stored in a local database. In various embodiments, the local database is stored in or accessible to the e911 computing system 102. In some embodiments, the entire e911 record is stored in the local database. In other embodiments, only a portion of the e911 record is stored in the local database. In at least one such embodiment, the portion of the e911 record that is stored in the local database may include parameters of the e911 record that may change, such as antenna tilt, antenna transmission power, type of radio, antenna azimuth, etc. Other, non-changeable parameters may not be stored in the local database.

Process 300 proceeds to block 312, where the new e911 record is provided to the management system, such as e911 data-management computing system 104 in FIG. 1. In some embodiments, the e911 record identifier along with all the e911 record data and parameters is provided to the e911 data-management system, such that the e911 data-management system can store the corresponding e911 record. After block 312, process 300 loops to block 302 to receive another e911 record identifier.

If, at decision block 308, the e911 record is not a new record, then process 300 flows from decision block 308 to decision block 314. At decision block 314, a determination is made whether the e911 record has changed. In some embodiments, the received e911 record identifier may include metadata or a tag indicating that the corresponding e911 record may have changed. In other embodiments, a last modified date of the e911 record may be compared to a current modified date of the e911 record to determine if the e911 record has changed or been modified. If the e911 record has changed, then process 300 flows to block 316; otherwise, process 300 loops to block 302 to receive another e911 record identifier.

At block 316, current e911 record data is obtained. In some embodiments, the current e911 record data may be obtained from the received e911 record identifier.

Process 300 proceeds to block 318, where previous e911 record data is obtained from the local database. In various embodiments, local database is queried using the received e911 record identifier to retrieve the locally-stored data of the corresponding e911 record.

Process 300 continues at block 320, where the current e911 record data is compared to the previous e911 record data. In some embodiments, a current value of each corresponding parameter of the e911 record is compared to a previous value of the corresponding parameter of the e911 record. In this way, differences in e911 record data is identified.

Process 300 proceeds next to block 322, where a table of e911 record changes is generated. The table may include an indication of the parameter that has changed and the change. In some embodiments, the table may include the new value. In other embodiments, the table may include an indication of how the parameter changed from the previous value to the current value. Although embodiments are described as generating a table of changes, embodiments are not so limited and other data structures may also be generated to identify the changes to the e911 record.

Process 300 continues next at block 324, where the table of e911 record changes is provided to the management system, such as e911 data-management computing system 104 in FIG. 1. In some embodiments, the e911 record identifier along with the generated table of changes is provided to the e911 data-management system, such that the e911 data-management system can store the changes in the corresponding e911 record. After block 324, process 300 loops to block 302 to receive another e911 record identifier.

Figure 4:
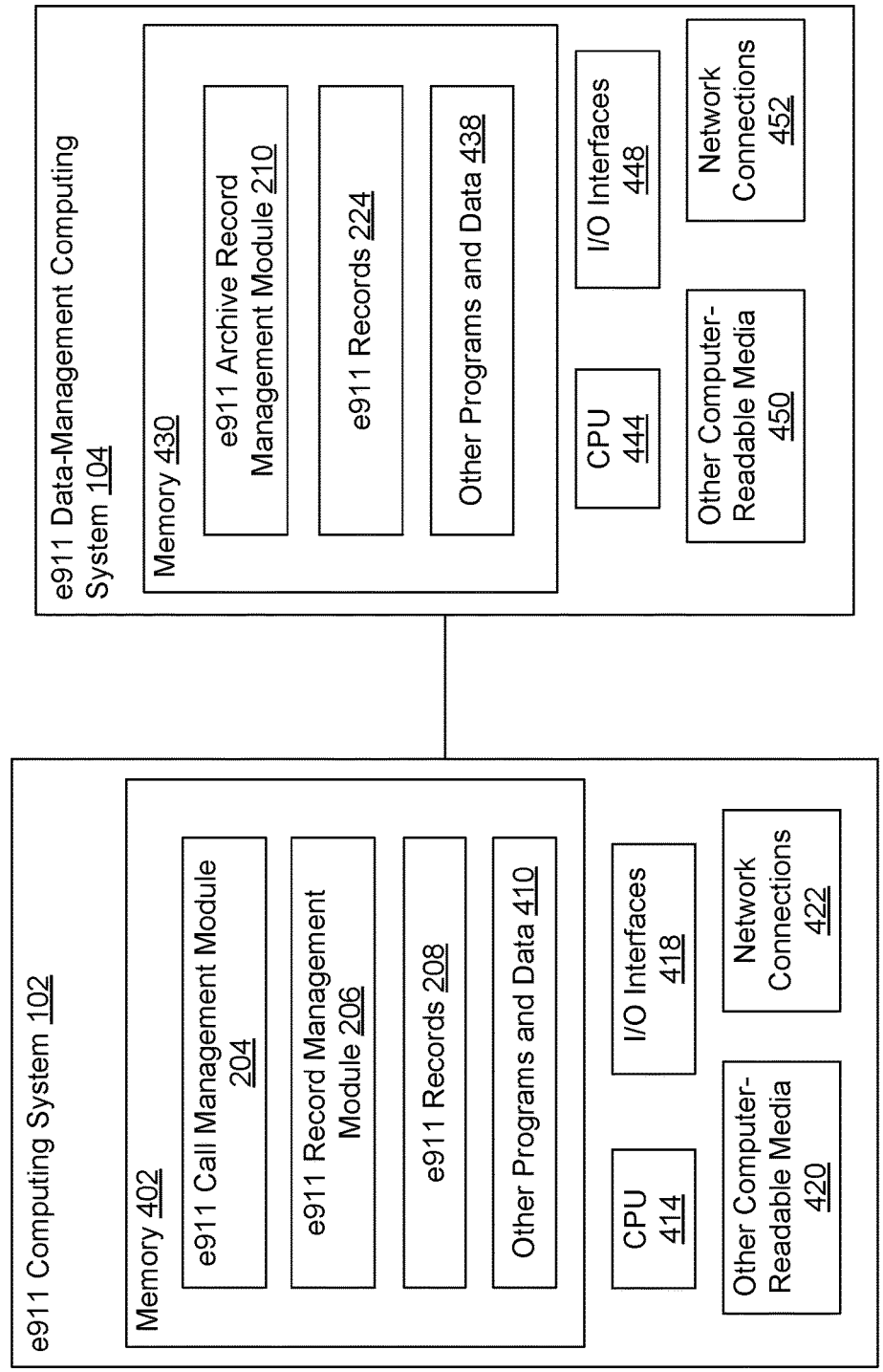
FIG. 4 shows a system diagram that describe various implementations of computing systems for implementing embodiments described herein.

FIG. 4 shows a system diagram that describe various implementations of computing systems for implementing embodiments described herein. System 400 includes an e911 computing system 102 and an e911 data-management computing system 104. As described herein, the e911 data-management computing system 104 is a computing system or environment that is remote from the e911 computing system 102 and that stores and maintains copies of e911 records.

The e911 computing system 102 manages e911 phone calls and maintains e911 records for such calls. The e911 computing system 102 provides information to the e911 data-management computing system 104 regarding new, changes, or deleted e911 records, as described herein. One or more special-purpose computing systems may be used to implement e911 computing system 102. Accordingly, various embodiments described herein may be implemented in software, hardware, firmware, or in some combination thereof. E911 computing system 102 may include memory 402, one or more central processing units (CPUs) 414, I/O interfaces 418, other computer-readable media 420, and network connections 422.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by CPU 414 to perform actions, including embodiments described herein.

Memory 402 may have stored thereon e911 call management module 204 and e911 record management module 208. The e911 call management module 204 is configured to coordinate, handle, and otherwise manage e911 calls between user devices 124 and 911 dispatcher 106 in FIG. 1. The e911 call management module 204 provides e911 records or e911 call data to the e911 record management module 206. The e911 record management module 206 is configured to obtain e911 records or information from the e911 call management module 204 and store a local database of records. The e911 record management module 206 determines if a record is new, changed, or deleted and pushes such information to the e911 data-management computing system 104 for archival storage and management, as described herein.

Memory 402 may also store e911 records 208 and other programs and data 410. The e911 records 208 may be configured to store the local database of e911 records that are accessed and maintained by the e911 record management module 206.

Network connections 422 are configured to communicate with other computing devices, such as e911 data-management computing system 104, to facilitate the storage and dynamic updating of e911 records. In various embodiments, the network connections 422 include transmitters and receivers (not illustrated) to send and receive data as described herein. I/O interfaces 418 may include a video interfaces, other data input or output interfaces, or the like. Other computer-readable media 420 may include other types of stationary or removable computer-readable media, such as removable flash drives, external hard drives, or the like.

The e911 data-management computing system 104 may be a cloud-based storage system or architecture that stores e911 records and data, as described herein. The e911 data-management computing system 104 is a remote system from the e911 computing system 102. One or more special-purpose computing systems may be used to implement the e911 data-management computing system 104. Accordingly, various embodiments described herein may be implemented in software, hardware, firmware, or in some combination thereof. E911 data-management computing system 104 may include memory 430, one or more central processing units (CPUs) 444, I/O interfaces 448, other computer-readable media 450, and network connections 452.

Memory 430 may include one or more various types of non-volatile and/or volatile storage technologies similar to memory 402. Memory 430 may have stored thereon e911 archive record management module 210 and e911 records 224. The e911 archive record management module 210 may receive new, changed, or deleted e911 records from the e911 computing system 102 and store such records in the e911 records 224. Memory 430 may also store other programs and data 438.

Network connections 452 are configured to communicate with other computing devices, such as e911 computing systems 102. In various embodiments, the network connections 452 include transmitters and receivers (not illustrated) to send and receive data as described herein. I/O interfaces 448 may include one or more other data input or output interfaces. Other computer-readable media 450 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
receiving, at an e911 computing system, an e911 record identifier of an e911 record;
determining, by the e911 computing system, if the e911 record has been deleted from a local database;
in response to determining that the e911 record has been deleted from the local database, notifying, by the e911 computing system, a management system of the e911 record being deleted, wherein the management system is remote from the e911 computing system;
determining, by the e911 computing system, if the e911 record is new;
in response to determining that the e911 record is new, providing, by the e911 computing system, the e911 record to the management system;
determining, by the e911 computing system, if the e911 record has changed; and
in response to determining that the e911 record has changed:
generating, by the e911 computing system, a table of changes to the e911 record; and providing, by the e911 computing system, the table of changes to the management system.

2. The method of claim 1, wherein generating the table of changes comprises:
obtaining, by the e911 computing system, current e911 record data for the e911 record;
obtaining, by the e911 computing system, previous e911 record data for the e911 record from the local database;
comparing, by the e911 computing system, the current e911 record data and the previous e911 record data to identify changes in the e911 record.

3. The method of claim 1, wherein generating the table of changes comprises:
obtaining, by the e911 computing system, current e911 record data for the e911 record;
obtaining, by the e911 computing system, previous e911 record data for the e911 record from the local database;
identifying, by the e911 computing system, changes in the e911 record based on a comparison between the current e911 record data and the previous e911 record data; and
generating, by the e911 computing system, the table of changes from the identified changes.

4. The method of claim 1, wherein determining if the e911 record has been deleted from the local database comprises:
querying, by the e911 computing system, the local database for the e911 record identifier; and
identifying, by the e911 computing system, the e911 record as being deleted in response to the e911 record identifier not being found in the query.

5. The method of claim 1, further comprising:
in response to determining that the e911 record is new, storing, by the e911 computing system, the e911 record in the local database.

6. The method of claim 1, further comprising:
in response to determining that the e911 record is new, storing, by the e911 computing system, an indication of the e911 record in the local database.

7. An e911 computing system comprising:
a memory that stores computer instructions; and
at least one processor that executes the computer instructions to:
receive an e911 record identifier of an e911 record;
determine if the e911 record has been deleted from a local database;
in response to determining that the e911 record has been deleted from the local database, notify a management system of the e911 record being deleted, wherein the management system is remote from the e911 computing system;
determine if the e911 record is new;
in response to determining that the e911 record is new, provide the e911 record to the management system;
determine if the e911 record has changed; and
in response to determining that the e911 record has changed:
generate a table of changes to the e911 record; and
provide the table of changes to the management system.

8. The e911 computing system of claim 7, wherein at least one processor generates the table of changes by further executing the computer instructions to:
obtain current e911 record data for the e911 record;
obtain previous e911 record data for the e911 record from the local database; and
compare the current e911 record data and the previous e911 record data to identify changes in the e911 record.

9. The e911 computing system of claim 7, wherein at least one processor generates the table of changes by further executing the computer instructions to:
obtain current e911 record data for the e911 record;
obtain previous e911 record data for the e911 record from the local database;
identify changes in the e911 record based on a comparison between the current e911 record data and the previous e911 record data; and
generate the table of changes from the identified changes.

10. The e911 computing system of claim 7, wherein at least one processor determines if the e911 record has been deleted from the local database by further executing the computer instructions to:
query the local database for the e911 record identifier; and
identify the e911 record as being deleted in response to the e911 record identifier not being found in the query.

11. The e911 computing system of claim 7, wherein the at least one processor further executes the computer instructions to:
in response to determining that the e911 record is new, store the e911 record in the local database.

12. The e911 computing system of claim 7, wherein the at least one processor further executes the computer instructions to:
in response to determining that the e911 record is new, store an indication of the e911 record in the local database.

13. A non-transitory computer-readable medium having contents that, when executed by at least one processor of an e911 computing system, cause the at least one processor to perform a method, the method comprising:
receiving an e911 record identifier of an e911 record;
determining if the e911 record has been deleted from a local database;
in response to determining that the e911 record has been deleted from the local database, notifying a management system of the e911 record being deleted, wherein the management system is remote from the e911 computing system;
determining if the e911 record is new;
in response to determining that the e911 record is new, providing the e911 record to the management system;
determining if the e911 record has changed; and
in response to determining that the e911 record has changed:
generating a table of changes to the e911 record; and
providing the table of changes to the management system.

14. The non-transitory computer-readable medium of claim 13, wherein generating the table of changes comprises:
obtaining current e911 record data for the e911 record;
obtaining previous e911 record data for the e911 record from the local database;
comparing the current e911 record data and the previous e911 record data to identify changes in the e911 record.

15. The non-transitory computer-readable medium of claim 13, wherein generating the table of changes comprises:
obtaining current e911 record data for the e911 record;
obtaining previous e911 record data for the e911 record from the local database;
identifying changes in the e911 record based on a comparison between the current e911 record data and the previous e911 record data; and generating the table of changes from the identified changes.

16. The non-transitory computer-readable medium of claim 13, wherein determining if the e911 record has been deleted from the local database comprises:
   querying the local database for the e911 record identifier; and
   identifying the e911 record as being deleted in response to the e911 record identifier not being found in the query.

17. The non-transitory computer-readable medium of claim 13, wherein the method further comprises:
   in response to determining that the e911 record is new, storing the e911 record in the local database.

18. The non-transitory computer-readable medium of claim 13, wherein the method further comprises:
   in response to determining that the e911 record is new, storing an indication of the e911 record in the local database.

* * * * *